US006971255B2

(12) United States Patent
Bhogal et al.

(10) Patent No.: US 6,971,255 B2
(45) Date of Patent: Dec. 6, 2005

(54) COMBINATION POWER CORD AND COMPUTER SECURITY SYSTEM

(75) Inventors: Kulvir Singh Bhogal, Ft. Worth, TX (US); Nizamudeen Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 10/759,934

(22) Filed: Jan. 16, 2004

(65) Prior Publication Data

US 2005/0157460 A1    Jul. 21, 2005

(51) Int. Cl.$^7$ .............................................. E05B 73/00
(52) U.S. Cl. .......................................... 70/58; 361/683
(58) Field of Search ............................... 361/683, 686; 174/36, 110 R, 113 R; 248/552, 553; 312/223.1; 70/58, 57, 14, 18, 23–34; 385/12, 101

(56) References Cited

U.S. PATENT DOCUMENTS

| | | | | |
|---|---|---|---|---|
| 5,398,530 A | * | 3/1995 | Derman | 70/58 |
| 5,579,657 A | * | 12/1996 | Makous | 70/15 |
| 6,159,025 A | * | 12/2000 | Derman | 439/134 |
| 6,227,502 B1 | * | 5/2001 | Derman | 248/74.4 |
| 6,297,963 B1 | * | 10/2001 | Fogle | 70/58 |
| 6,389,853 B1 | * | 5/2002 | Pate et al. | 70/18 |
| 6,522,532 B2 | | 2/2003 | Liao et al. | |
| 6,622,532 B2 | * | 9/2003 | Hsu | 70/14 |
| 6,763,688 B1 | * | 7/2004 | Syu | 70/14 |
| 2002/0134119 A1 | | 9/2002 | Derman | |
| 2004/0261473 A1 | * | 12/2004 | Avganim | 70/58 |
| 2005/0039502 A1 | * | 2/2005 | Avganim | 70/58 |

OTHER PUBLICATIONS

U.S. Appl. No. 09/813,924, filed Sep. 26, 2002, Derman.

* cited by examiner

*Primary Examiner*—Lisa Lea-Edmonds
(74) *Attorney, Agent, or Firm*—Diana R. Gerhardt; Dillon & Yudell LLP

(57) ABSTRACT

A combination power cord and security system for a portable computing device. A security cable is provided which is constructed of a sheath of braided steel or other secure material. A lockable connector is mounted to one end of the security cable for connection to the portable computing device. A loop is provided at the other end for affixing the security cable to an anchor object. A power cable is formed integrally with the security cable. The power cable includes a power adaptor preferably mounted within the connector at one end of the security cable and a power plug at the other end for receiving electrical power.

16 Claims, 2 Drawing Sheets

COMBINATION POWER CORD AND COMPUTER SECURITY SYSTEM

BACKGROUND OF THE INVENTION

1. Technical Field

The present invention relates in general to portable computing security devices and in particular to security devices that limit movement of a portable computer by unauthorized individuals. Still more particularly, the present invention relates to a combination power cord and computer security system.

2. Description of the Related Art

Portable computing devices such as, for example, laptop computers, have become increasingly popular and increasingly technologically complex. The increased desirability of such devices has resulted in an increased likelihood that the computing device may be stolen. Consequently, theft-deterrent devices utilized with such portable computing systems have become well known.

Many portable computing devices are provided with a specially designed security slot which may be utilized to lock the computer to a particular physical location. Examples of such devices may be seen in U.S. Pat. No. 6,000,251, U.S. Pat. No. 5,502,989 and U.S. Pat. No. 6,155,088.

Devices such as those disclosed within the above-referenced patents are effective at deterring unauthorized movement of a portable computer device to which such devices are secured by localizing the portable computing device to a relatively immovable object. The materials of the lock are designed so that the housing must be damaged in order to separate the lock from the portable device, thus inhibiting unauthorized movement of the portable device.

As successful as such devices are, these devices are unable to provide protection for portable computing devices, when the portable computing device in question lacks a particular security slot. Further, such devices frequently do not prevent the unauthorized use of the portable computing device while it is secured by such devices, and the user is required to carry around a security cable and lock, in addition to the other accessories necessary to operate a portable computer.

U.S. Pat. No. 6,522,532 discloses a cable docking system for utilization with a computer which permits the computer to be securely engaged to a docking system which is permanently mounted to a table, desk or other device. Such devices provide excellent security for portable computing devices; however, the advantage of portable computing devices is the ability of a user to utilize such device in many different locations and the necessity of utilizing the device only in the presence of a docking station, such as that disclosed with the aforementioned patent, mitigates against widespread use of this technique.

Consequently, it should be obvious that a need exists for a portable computing security device which may be easily carried by the user of such a portable computing device and which does not add substantially to the complexity of utilizing such a device.

SUMMARY OF THE INVENTION

It therefore one object of the present invention to provide an improved portable computing security device.

It is another object of the present invention to provide an improved portable computing security device which limits movement of a portable computer by unauthorized individuals.

It is yet another object of the present invention to provide a combination power cord and computer security system which may be utilized to prevent unauthorized movement of portable computing devices.

The foregoing objects are achieved as is now described. A combination power cord and security system for a portable computing device are disclosed. A security cable is provided which is constructed of a sheath of braided steel or other secure material. A lockable connector is mounted to one end of the security cable for connection to the portable computing device. A loop is provided at the other end for affixing the security cable to an anchor object. A power cable is formed integrally with the security cable. The power cable includes a power adaptor preferably mounted within the connector at one end of the security cable and a power plug at the other end for receiving electrical power.

BRIEF DESCRIPTION OF THE DRAWINGS

The novel features believed to be characteristic of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

BRIEF DESCRIPTION OF THE PREFERRED EMBODIMENT

Figure 1:
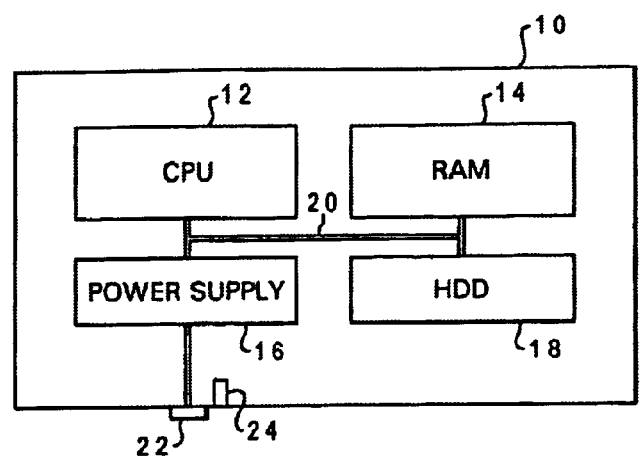
FIG. 1 is a high level block diagram of a portable computing device which may be utilized with the security system of the present invention.

With reference now to the figures and in particular with reference to FIG. 1, there is depicted a high level block diagram of a portable computing device 10 which may be utilized with the security system of the present invention. As depicted, portable computing device 10 includes a central processing unit 12, random access memory 14 and a non-volatile storage device such as Hard Disk Drive (HDD) 18. Additionally, power supply 16 is depicted within portable computing device 10. Each of these elements is interconnected via bus 20 in a manner well known to those having ordinary skill in the art and disclosure of the specifics of such construction is not part of the present invention.

Still referring to FIG. 1, as depicted therein, power supply 16 is coupled to power terminal 22. Power terminal 22 is preferably mounted externally on the chassis of portable computing device 10 in a manner well known in the prior art. Additionally, proximate to power terminal 22 is lock receptacle 24. Lock receptacle 24 will be utilized in a manner which will be described in greater detail herein, to affix one end of the combination power cord and security system to portable computing device 10 in a manner which will prevent unauthorized movement thereof.

Figure 2:
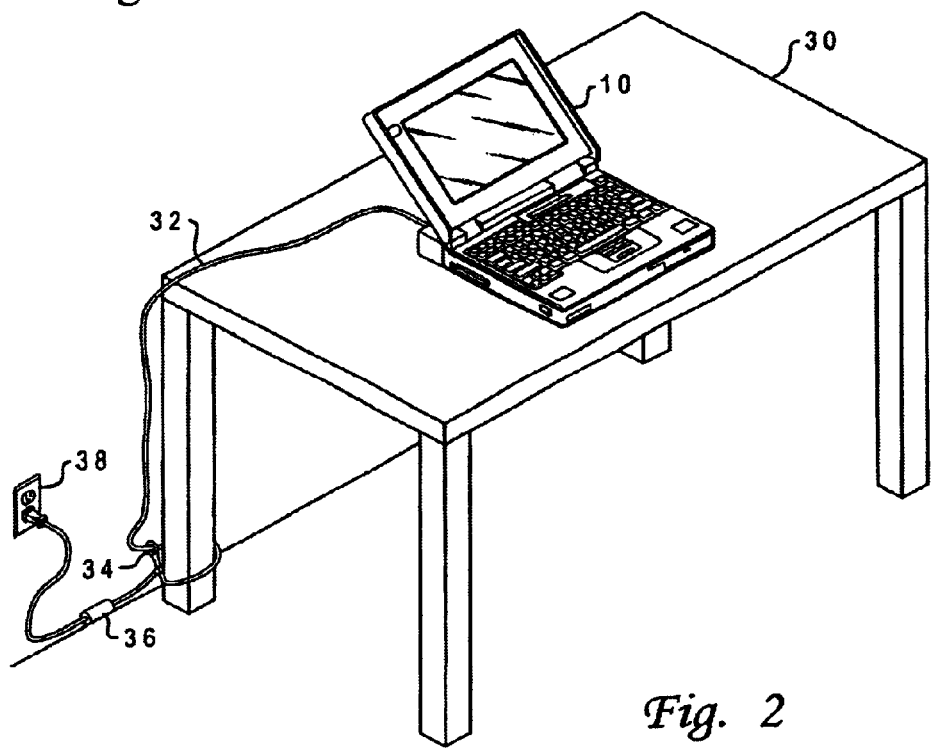
FIG. 2 is a pictorial representation of a portable computing device secured by utilizing the combination power cord and security system of the present invention.

Referring now to FIG. 2, there is depicted a pictorial representation of a portable computing device which is secured utilizing the combination power cord and security system of the present invention. As illustrated, portable computing device 10 is disposed upon table 30. A combination power cord and security cable 32 is utilized to couple portable computing device 10 to electrical power. Combination power cord and computer security cable 32 preferably includes a connector (not shown) at one end thereof for lockable connection to portable computing device 10 and a loop 34 sized to permit the connector to pass therethrough which may be utilized to anchor portable computing device 10 to table 30 or another similar immoveable object.

An AC power unit 36 is depicted. AC power unit 36 plugs into an electrical plug present within combination power cord and security cable 32 and provides electrical power to an electrical power cable formed integrally with combination power cord and security cable 32. Finally, AC power unit 36 is depicted as being plugged into electrical outlet 38, and electrical power is thus provided to portable computing device 10.

Figure 3:
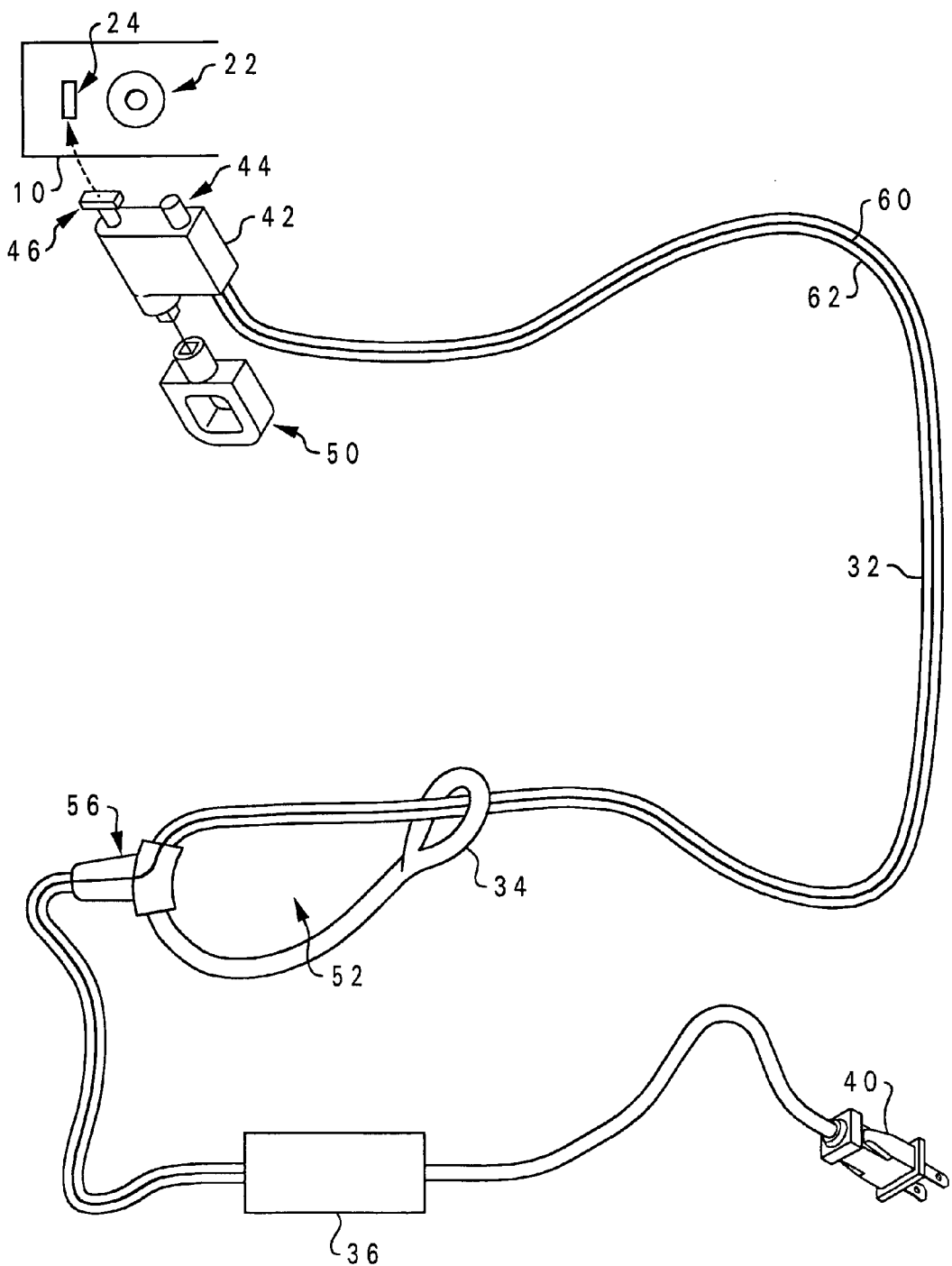
FIG. 3 is a partially cutaway, schematic representation of the combination power cord and security system of the present invention.

Finally, with reference to FIG. 3, there is depicted a partially cutaway, schematic representation of combination power cord and security cable 32 of FIG. 2. As illustrated, portable computing device 10 preferably includes a power terminal 22 and a lock receptacle 24. As illustrated, connector 42 is securely mounted to one end of combination power cord and security cable 32. Connector 42 preferably includes a power adaptor 44, adapted to mate with power terminal 22 and a lock cylinder 46 which is adapted to mate with lock receptacle 24. A key 50 is provided such that when connector 42 is plugged into portable computing device 10 and key 50 is activated, lock cylinder 46 rotates, securing connector 42 to portable computing device 10. Of course, those skilled in the art will appreciate that a combination lock may also be utilized without departing from the spirit of the invention.

As illustrated in cutaway fashion, combination power cord and security cable 32 is preferably formed utilizing a braided steel sheath 62, or other suitable secure materials such as, for example, an aramid fiber such as Kevlar™. Kevlar™ is a trademark of the EI du Pont de Nemours and Company. Embedded within sheath 62 is an electrical cable 60. The end of combination power cord and security cable 32 opposite connector 42 preferably includes a loop 34 which is sized to permit connector 42 to pass therethrough. In this manner, a bight 52 may be formed which is suitable for anchoring portable computing device 10 to a large and preferably immovable object, such as table 30.

As depicted, combination power cord and security cable 32 preferably includes a power connection 56 into which a power cable may be temporarily plugged and which connects the embedded electrical cable 60 within combination power cord and security cable 32 to AC power unit 36. AC power unit 36 conventionally utilizes power plug 40 to provide operating electrical power to portable computing device 10.

As described herein, Applicants have provided a combination power cord and security cable which replaces the ordinary power cord provided with portable computing devices, such as laptop computers. By securing the electrical cable typically utilized in a power cord within a security material sheath constructed of braided steel or Kevlar™ and providing the loop depicted within FIG. 3, a user of portable computing device 10 may rapidly and efficiently secure portable computing device 10 to a large and immovable object, greatly enhancing the security of that device, without requiring the user to carry additional security cables or devices beyond the secure power cord provided.

While the invention has been particularly shown and described with reference to a preferred embodiment, it will be understood by those skilled in the art that various changes in form and detail may be made therein without departing from the spirit and scope of the invention.

What is claimed is:

1. A security system for use with a portable computing device, said security system comprising:
    a security cable having a connector at a first end thereof for lockingly engaging with a portable computing device and a loop at a second end thereof for affixing said security cable to an anchor object; and
    a power cable integrally formed with said security cable having a power adapter at said first end proximate to said connector for providing electrical power to said portable computing device and a power plug at said second end for receiving electrical power.

2. The security system according to claim 1 wherein said power adapter is mounted within said connector.

3. The security system according to claim 1 wherein said power cable is integrally formed within said security cable.

4. The security system according to claim 1 wherein said security cable is formed of braided steel.

5. The security system according to claim 1 wherein said security cable is formed of an aramid fiber.

6. The security system according to claim 1 wherein said loop and said connector are sized to permit said connector to pass through said loop.

7. The security system according to claim 1 further including an AC power unit for interconnecting said power plug with a source of electrical power.

8. The security system according to claim 1 wherein said connector includes a lock cylinder operable by a key for selectively lockingly engaging said connector with a portable computing device in response to operation of said lock cylinder by said key.

9. A secure computer system comprising:
    a chassis having an exterior surface;
    a processor unit mounted within said chassis;
    an electrical power terminal mounted on said exterior surface for coupling external electrical power to said processor unit;
    a lock receptacle mounted on said exterior surface proximate to said electrical power terminal;
    a security cable having a connector at a first end thereof for lockingly engaging with said lock receptacle and a loop at a second end thereof for affixing said security cable to an anchor object; and
    a power cable integrally formed with said security cable having a power adapter at said first end proximate to said connector for connection to said electrical power terminal and a power plug at said second end for receiving electrical power.

10. The secure computer system according to claim 9 wherein said power adapter is mounted within said connector.

11. The secure computer system according to claim 9 wherein said power cable is integrally formed within said security cable.

12. The secure computer system according to claim 9 wherein said security cable is formed of braided steel.

13. The secure computer system according to claim 9 wherein said security cable is formed of an aramid fiber.

14. The secure computer system according to claim 9 wherein said loop and said connector are sized to permit said connector to pass through said loop.

15. The secure computer system according to claim 9 further including an AC power unit for interconnecting said power plug with a source of electrical power.

16. The secure computer system according to claim 9 wherein said connector includes a lock cylinder operable by a key for selectively lockingly engaging said connector with said lock receptacle in response to operation of said lock cylinder by said key.

* * * * *